(12) United States Patent
Stein et al.

(10) Patent No.: US 7,761,094 B2
(45) Date of Patent: Jul. 20, 2010

(54) SUPPORTING MOBILE COMMUNICATIONS SESSION IN A COMBINED COMMUNICATIONS NETWORK

(75) Inventors: Shai Stein, Raanana (IL); Moredechay Morgenstern, Petach Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 350 days.

(21) Appl. No.: 10/587,931

(22) PCT Filed: Mar. 28, 2005

(86) PCT No.: PCT/IL2005/000352

§ 371 (c)(1),
(2), (4) Date: Aug. 2, 2006

(87) PCT Pub. No.: WO2005/096663

PCT Pub. Date: Oct. 13, 2005

(65) Prior Publication Data

US 2007/0259660 A1    Nov. 8, 2007

(30) Foreign Application Priority Data

Apr. 1, 2004    (IL) .................................... 161216

(51) Int. Cl.
- H04W 4/00    (2009.01)
- H04M 3/42    (2006.01)
- H04B 7/24    (2006.01)

(52) U.S. Cl. .................... 455/426.1; 455/417; 455/439; 455/462

(58) Field of Classification Search ................. 455/417, 455/426.1, 439, 461–465
See application file for complete search history.

(56) References Cited

U.S. PATENT DOCUMENTS

| 5,873,033 | A | * | 2/1999 | Hjern et al. ................. 455/417 |
| 5,878,343 | A | | 3/1999 | Robert et al. |
| 5,909,650 | A | | 6/1999 | Jonsson |
| 6,301,474 | B1 | | 10/2001 | Hartmaier et al. |
| 6,658,253 | B1 | | 12/2003 | Berggren et al. |
| 6,708,028 | B1 | * | 3/2004 | Byrne ..................... 455/426.1 |
| 7,660,292 | B2 | * | 2/2010 | Wong ......................... 370/352 |

(Continued)

FOREIGN PATENT DOCUMENTS

DE    19536462    12/1995

(Continued)

*Primary Examiner*—Dwayne Bost
*Assistant Examiner*—Michael Mapa
(74) *Attorney, Agent, or Firm*—Browdy and Neimark, PLLC (57) ABSTRACT

A technique is proposed for supporting a mobile communication session in a combined communications network comprising a mobile network and a non-mobile access network. In the mobile network, the mobile communication session is associated with a mobile number. The technique comprises: a) associating, in the non-mobile access network, the mobile number with a non-mobile device of the non-mobile network, b) providing an access device being in communication with a plurality of non-mobile devices of the non-mobile network and with a controller of a mobile network, operative to represent the non-mobile device of the plurality of non-mobile devices as having the mobile number; c) selectively conducting the mobile communication session either through a mobile device associated with the mobile number in the mobile network, or through the non-mobile device associated with the mobile number in the non-mobile network.

22 Claims, 2 Drawing Sheets

U.S. PATENT DOCUMENTS

2003/0069014 A1* 4/2003 Raffel et al. ................. 455/426
2003/0087629 A1* 5/2003 Juitt et al. ................... 455/411
2004/0196810 A1* 10/2004 Kil et al. ..................... 370/331
2004/0221029 A1* 11/2004 Jenkins et al. ............... 709/223
2004/0235518 A1* 11/2004 Beyette et al. ........... 455/554.2

FOREIGN PATENT DOCUMENTS

EP  0 719 064 A2  6/1996
EP  1 032 226 A1  2/2000

* cited by examiner

SUPPORTING MOBILE COMMUNICATIONS SESSION IN A COMBINED COMMUNICATIONS NETWORK

FIELD OF THE INVENTION

The present invention relates to a procedure, a device and a telecommunication system, which allow utilizing mobile telephone services in non-mobile telecommunication networks.

BACKGROUND OF THE INVENTION

There is known a technology of using one and the same personal telephone number recognizable in different telecommunications networks. For example, EP 0738093 A2 (to TELIA AB), which is incorporated herein by reference, describes the technology where one telephone number is associated with a subscriber in various different communications networks. A condition for using this personal number is a central network node located at or being in communication with the mentioned different networks, preferably PSTN, ISDN, or mobile networks such as GSM and NMT (Nordic Mobile Telephony). The central network node does not influence network functions, numbering schemes and terminals in these networks. When a call is directed to a subscriber associated with any of the mentioned telecommunications network or utilizing a cordless access system, the call (independent of which telecommunications network it emanates) is connected to this central network node which converts the received personal number to the specific number corresponding to the communications network at which the subscriber has registered himself/herself. Upon that conversion, the network node connects the call to the current access point which corresponds to the specific number.

Also, there is known a U.S. Pat. No. 6,301,474 (to Openwave Technologies Inc.) which is incorporated hereby by reference, describing a mobility extended telecommunication application. The technology comprises an integrated wireless and wireline network with central control, which has a programmed interface to translate between the different protocols of the wireless and the wireline networks to allow for automatic redirection of a new incoming call, that is about to be established, between a telephone device of the wireless network and a telephone device of the wireline network.

EP 0763 308 B1 describes an arrangement for interconnecting a cellular communication system and a cordless access system. The interconnecting arrangement comprises an interworking function (IWF) which via an existing interface of the cellular system is connected to a Mobile Switching Center thereof and which via another interface is connected to a cordless access system. However, some of the major drawbacks of the disclosure in this EP patent are that the interworking function is workable only with cordless devices, and that it requires a DECT fixed part associated with each of the users of this solution.

The services proposed in the above patent publications are quite advanced. However, there are quite a few drawbacks to the methods described. Every user who intensively uses the phone, often encounters the situation when a conversation starts while using a fixed phone (cordless or not) but, since the user must leave the premises, the conversation has to be stopped and, upon redialing, to be continued from a mobile phone. The users are also familiar with an opposite situation, when a communication session starts at a mobile phone and after a period of time could have been continued at a fixed or cordless phone (e.g. while obtaining a higher quality of service and/or while using more comfortable appliances at the premises), but the cumbersome operation of disconnecting and re-connecting prevents the user from making that switch.

There are also many other situations where a user of a mobile network (who is also a user of a non-mobile network) would be interested of transparently using facilities of the non-mobile network and facilities of the mobile network whenever desired.

SUMMARY OF THE INVENTION

The objects of the present invention, among which resolving the problems outlined above, will be explained as the description of the invention proceeds.

There is a need of providing a user (or a group of users), when conducting a communication session in a combined network comprising a mobile network and a non-mobile access network, with a possibility to freely switch from a mobile communication device to a non-mobile communication device and vice versa, in some cases even during one communication session. The Inventors propose achieving that by associating the non-mobile access network (to which the non-mobile device belongs) with the mobile network in a manner that for the mobile network it would seem that the access network is as another part of that mobile network and the non-mobile device(s) would be handled by the mobile network as mobile device(s).

By an embodiment of the present invention there is proposed a method of supporting a mobile communication session in a combined communications network comprising a mobile network and a non-mobile access network; in said mobile network, said mobile communication session is associated with a specific mobile number, the method comprises:

associating, in the non-mobile access network, said specific mobile number with a non-mobile device of said non-mobile network, providing an access device being in communication with a plurality of non-mobile devices and with a controller of a mobile network, operative to represent said non-mobile device of said plurality of non-mobile devices as having said specific mobile number;

selectively conducting said mobile communication session either through a mobile device associated with said mobile number in the mobile network, or through the non-mobile device associated with said mobile number in the non-mobile network.

When reference is made to a mobile communication session associated with a mobile number, it should be understood to encompass that, for the mobile network, said mobile number is either the source or the destination of said communication session. It should be noted, however, that a communication path along which the communication session is held, may further comprise other component section(s).

To allow the access non-mobile network behave as being a part of the mobile network, the access device is capable of at least partially performing functions of a base station associated with the mobile network with respect to at least said specific mobile number of said mobile network, so that for the controller with which this access device is associated, the access device is considered as another base station, preferably that is capable of performing additional functions such as setting priorities for routing of communication sessions.

By an embodiment of the invention, the access device may set a default that causes routing the mobile communication session to the non-mobile device at a highest priority, for example when the access device is in a predetermined communication with the non-mobile device and thus capable to report that to the controller. However, the priorities/defaults can be adjusted when required. Another example of setting priorities/defaults at the access device is an option to select whether an outgoing communications session from a non-mobile device will be a mobile session (i.e., allowed for further rerouting) or a plain non-mobile session.

Association of the specific mobile number with the non-mobile device of said non-mobile network can be performed by storing an indication of such association at the access device, e.g. in a table stored thereat.

There is a number of basic embodiments of the mobile and non-mobile devices, which are mentioned herein for exemplifying and better understanding the present invention.

1. The mobile device and the non-mobile device may be one and the same communication device having one and the same mobile number. It is a case of a mobile device with a DECT functionality. A cordless DECT device comprises a receiver and a base part; the receiver of the DECT serves as a mobile device when is situated far from its base part, and when the receiver is in proximity with the base part, they together serve as a non-mobile device.

2. The mobile number may be a common number for two separate communications devices: one being the mobile device and the other, the non-mobile device.

3. The mobile and the non-mobile devices may be two different devices having two respective separate numbers: the mobile number and a non-mobile number.

Various examples of applying the solutions provided by the present invention will be further presented herein.

As was previously mentioned, one embodiment of the present invention is a solution that allows transferring a communication session while in progress from the non-mobile device to the mobile device, or vice versa.

By an embodiment of the present invention, the method supports re-routing the communication session being in progress from the mobile device (e.g. a cellular telephone and the like) associated with the mobile communications network to the non-mobile device (e.g. a desk telephone, a cordless telephone and the like, a computer, etc.) associated with the non-mobile communications network, or vice versa.

The rerouting is normally preceded by obtaining a suggestion to reroute the communication session.

The proposed selective use of the two communication devices (and particularly, said rerouting) is most useful when the mobile and the non-mobile devices are located in proximity to one another.

Therefore, the method preferably includes a step of determining proximity of the mobile device to the non-mobile device. Optionally, in this case the step of determining proximity constitutes said suggestion for rerouting.

The step of obtaining the rerouting suggestion, in particular case—the step of determining the proximity, can be performed either automatically (in case of the DECT type wireless telephone serving both the mobile device and non-mobile device), or non-automatically—based on a signaling action initiated by the user.

The above-discussed step may comprise various sub-steps (regardless whether there is or there is no geographical proximity between the devices): for example, it usually comprises an initial signaling message issued by one of said non-mobile device and mobile device to said access device or to a base station of the mobile network, respectively. Such a signaling message actually is a suggestion to perform the rerouting. The message may either inform on the automatically detected proximity between the devices, or be just a request of rerouting initiated by the user from one of the devices, by inserting a code or pressing a key. The suggestion of rerouting is preferably applied from the device presently not engaged with the communication session and may result in revealing (i.e., may optionally comprise—implicitly or explicitly) information on the number of the device to which the rerouting is requested. In one embodiment of the method, it comprises storing, in the access device, information on a group of non-mobile devices and mobile devices that are pair-wise entitled for rerouting communication sessions there-between.

Optionally, the method described above further comprises a step where, upon obtaining the suggestion of rerouting, the user presently engaged in the communication session via one of said devices receives an indication that he/she may switch to the other device. Still optionally, the re-routing step is carried out following a response received from the user to that indication.

According to yet another embodiment of the invention, the method may further comprise providing the controller of the mobile network with a capability of giving preference to routing the mobile communication session to said non-mobile device via said access device. Normally, such a preference would be decided upon if the access device, while performing its function(s) as a base station, reports to the controller that it is ready to handle a mobile session, the session will be routed from the controller through the access device even if that session might be supported by other "normal" base station(s). However, the preference can be adjusted when required.

A regular example of the communication session is a telephone call. However, both the mobile device and the non-mobile communication device are devices that are capable of allowing not only to carry out voice sessions, but also fax transmissions, data communications, multimedia sessions, etc. It means that the mobile communication device can be a personal computer having a cellular connection to the Internet, a mobile phone with the fax and Internet functionality, etc.

The mobile network should be understood as a cellular network.

The access non-mobile network can be, for example, a fixed PSTN (Plain Service Telephone Network), a wireless LAN (Local Area Network), etc. Preferably, the method comprises connecting the access device via wireline means both to the access non-mobile network and to the controller of the mobile network.

The access device can be in the form of a DSLAM (Digital Service Line Access Multiplexer), a DSLAM in combination with a CPE (Customer Premises Equipment); in these cases the wireline means connecting the access device with the non-mobile communication network will comprise DSL or xDSL lines.

Alternatively, the access device can be in the form of OLT (Optical Line Termination), or OLT in combination with an ONU or ONT (Optical network Unit or Optical Network Termination, respectively), wherein the wireline means between the access device and the non-mobile access network comprise one or more optical fibers.

The controller of the mobile network may, for example, be a radio network controller RNC or the like (say, BSC—base station controller) belonging to the mobile (cellular) network.

The method turns the non-mobile network to become a part of the mobile network and allows performing a variety of new communication options in such a combined communications network.

According to another aspect of the invention, there is proposed an access device of a non-mobile access network for serving in a combined communications network comprising said non-mobile network and a mobile network, wherein the access device being adapted to communicate with at least a plurality of non-mobile devices of the non-mobile network and a controller of a mobile network, and wherein the access device being operative to represent at least one non-mobile device of said plurality of non-mobile devices as having a mobile number of the mobile network;

wherein the access device is capable of performing, at least partially, functions of a base station of the mobile network for at least said mobile number of said mobile network, by providing an option to conduct a mobile communications session, associated in said mobile network with said mobile number, through said non-mobile device of the non-mobile network.

Preferably, the mobile telephone number belonging to said mobile network is stored in said access device as a number that is associated with a non-mobile device connected to said non-mobile network.

The access device allows said mobile communication session, being initially conducted through either said non-mobile device or a mobile device associated with said stored mobile number, to be continued by selectively using the other of said mobile device or said non-mobile device.

To implement the above capabilities, the access device is preferably characterized by:

being connectable (preferably, by wireline means) with said non-mobile access network and with a controller of said mobile network to enable digital communication, capable of converting communication protocols from at least one protocol used in said mobile network to at least one protocol used in said non-mobile network, and vice versa, being provided with a functional unit performing functions similar to that of a base station of said mobile network, including:

enabling storing at the access device at least one said mobile number assigned to a mobile device, in association with at least one said non-mobile device, monitoring and processing signaling sessions and communications sessions associated with said mobile telephone number.

Certain mobile numbers are registered at the access device. Although these numbers are still associated with the mobile devices to which they belong and are used as any other mobile number associated with a mobile device, still they are linked with an address (e.g. a telephone number) of non-mobile devices. One example of such a linkage is a DECT telephone where a receiver serves a mobile device when out of the area of the base part. So, if the receiver is sensed by its base part, the access device will receive a signaling event from the base part, and the signaling event can be understood by the access device as a request to initiate rerouting of a next (or even the current) mobile communication session to be held, at its "edge" section, via the non-mobile network and not via the mobile network.

Another example is that the access device holds registration of a particular mobile number entitled to obtain from the access device some services similar to those of a base station. Suppose a user, using a non-mobile device in the access network, is engaged in a communication session with some remote destination via a mobile network. The session is mobile, and for the mobile network the source number is the registered mobile number (just the mobile number is registered in the access device in relation to the non-mobile device and, possibly, to its separate number). Suppose the user now wishes to reroute the session, (say, to be held by his partner) to a mobile device with the registered mobile number. The mobile device may be located far from the access network, but if the non-mobile device issues a signaling event requesting the rerouting to the registered mobile number, the access device will initiate a request to the controller of the mobile network to redirect the communication session to another (regular) base station of the mobile network.

If the mobile device is located close to the non-mobile device and the user wishes to switch the session to a mobile device, the user actually reports on the proximity of the mobile device and requests for rerouting, either by signaling from the non-mobile device to the access device, or from the mobile device to a closest regular base station of the mobile network. The remaining steps are the same as above: the controller of the mobile network may drop the session via the access device and to reroute the session to the mobile device via a regular base station of the mobile network.

Another example: a communication session is held via a mobile device whose number is registered in the access device in association with a particular number of a non-mobile device (say, of the same user). When the user's mobile device is brought close to the non-mobile device, the user may decide to seamlessly switch to the mentioned non-mobile device; to do that, the user may signal from the non-mobile device to the access device to request rerouting the session. The access device thus understands that the mobile device is in the access network ("senses it indirectly"), and may then ask the controller of the mobile network to reroute the current session via the access device to the non-mobile device.

Many other examples and variations of the versatile use of the mobile and non-mobile devices in the described combined network could be imagined. All such variations should be understood to be encompassed by the present invention.

Therefore, the access device preferably allows storing said mobile telephone number to allow its association with at least one non-mobile telephone number assigned in said non-mobile network to a non-mobile device.

Further, the functional unit performing functions similar to that of a base station of said mobile network preferably enables obtaining and processing information which may serve for indirectly determining proximity of the mobile device associated with said registered mobile telephone number.

It goes without saying that the access device is capable of monitoring and processing signaling and communication sessions with respect to said non-mobile device/telephone number.

As a result, the proposed access device enables versatile use of said mobile and non-mobile devices in the combined communications network, based on monitoring and processing of signaling and communication sessions in respect of both said non-mobile and said mobile telephone numbers.

In the preferred embodiment of the access device, it is adapted to support rerouting of a communication session, when in progress via said non-mobile device of the non-mobile network, to said mobile device of the mobile network and/or vice versa.

Usually, the mobile number and the non-mobile number are assigned to one user or a number of associated users.

The access device preferably comprises a DSLAM (Digital Signal Line Access Multiplexer) routinely serving said non-mobile network by supporting protocol(s) of the non-mobile network. In addition the access device (DSLAM) comprises the functional block (one or more cards) constituting a hardware/software means and a memory means enabling the access device to perform the above-mentioned new capabilities and functionalities. It should be noted that in a particular embodiment, the access device may constitute a DSLAM in combination with a modified Customer Premises Device (CPE) serving a specific local network as part of the access network; in this case the hardware/software means can be distributed between the CPE and the DSLAM. For example, the protocol-transforming block can be located at the CPE.

As has been mentioned, the access device can alternatively be in the form of an enhanced OLT (Optical Line Termination) or OLT in combination with ONU or ONT.

According to yet a further aspect of the invention, there is provided a system operative to support a communication session in a combined network, the system comprising at least one access device as described above, at least one non-mobile communications network connected to said access device and comprising at least one non-mobile communications device, and at least one mobile communications network associated with at least one mobile communication device and having a controller of the mobile network connected to said access device (preferably by wireline means) and operative to establish digital communication with said access device.

As will be appreciated by those skilled in the art, the non-mobile networks may implement connections to the subscribers, inside home networks, by applying one or more various technologies that are currently in use for access networks. Examples of such technologies are POTS (in which case the digital signal received at the edge node device is converted into an analogue POTS signal, and shall be forwarded to the non-mobile device as such), ATM (where the signal may be forwarded to the non-mobile device as a VoATM signal), DSL (where the signal may be forwarded to the non-mobile device as a VoDSL signal), IP (where the signal may be forwarded to the non-mobile device as a VoIP signal), Bluetooth, UWB, Wimax, Wi-Fi (where the signal may be forwarded wireless to the non-mobile wireless phone), and the like.

The non-mobile network may comprise a number of fixed communication devices, one or more cordless communication devices, some of them connected in parallel (for example, a simple desk telephone and a cordless telephone in parallel). In the present specification, the non-mobile network may comprise at least one Local Area Network (LAN) serving an office, a house, an apartment or the like; it can also be a wireless LAN having a CPE connected to the edge node by wireline means.

The controller of the mobile network may, for example, be RNC (Radio Network Controller), a BSS (Base Stations Server), BSC (Base Station Controller) or a unit performing similar controlling and coordinating functions in the mobile (cellular) network. For example, these functions may include obtaining information from base stations of the mobile network about location of the registered mobile devices, and deciding which of the base stations supports a specific communication session with a specific device.

Owing to the new functionality of the access device, in particular its "quasi-base station functionality", the non-mobile network actually becomes part of the mobile (cellular) network.

It can be demonstrated by all the above-mentioned examples, and the scenarios presented in the detailed description. In particular, when the communication session in progress is held on a mobile device and then rerouted to be held through a non-mobile communication device, the session at the main portion of its communication path continues to be transmitted via and supported by the mobile (cellular) network, as it was made before switching to the non-mobile device, though it is now supported by a "quasi base station" (the access device) at the termination section of the communication path which becomes a section of the non-mobile network instead of a section of the mobile network.

Though the user continues using the mobile (cellular) service when switching to a non-mobile network phone, it can be cost effective to both the service providers and the users, due to providing/enjoying the new useful feature.

BRIEF DESCRIPTION OF THE DRAWINGS

The invention will be further described with reference to the following non-limiting drawings, in which.

DETAILED DESCRIPTION OF THE PREFERRED EMBODIMENTS

Figure 1:
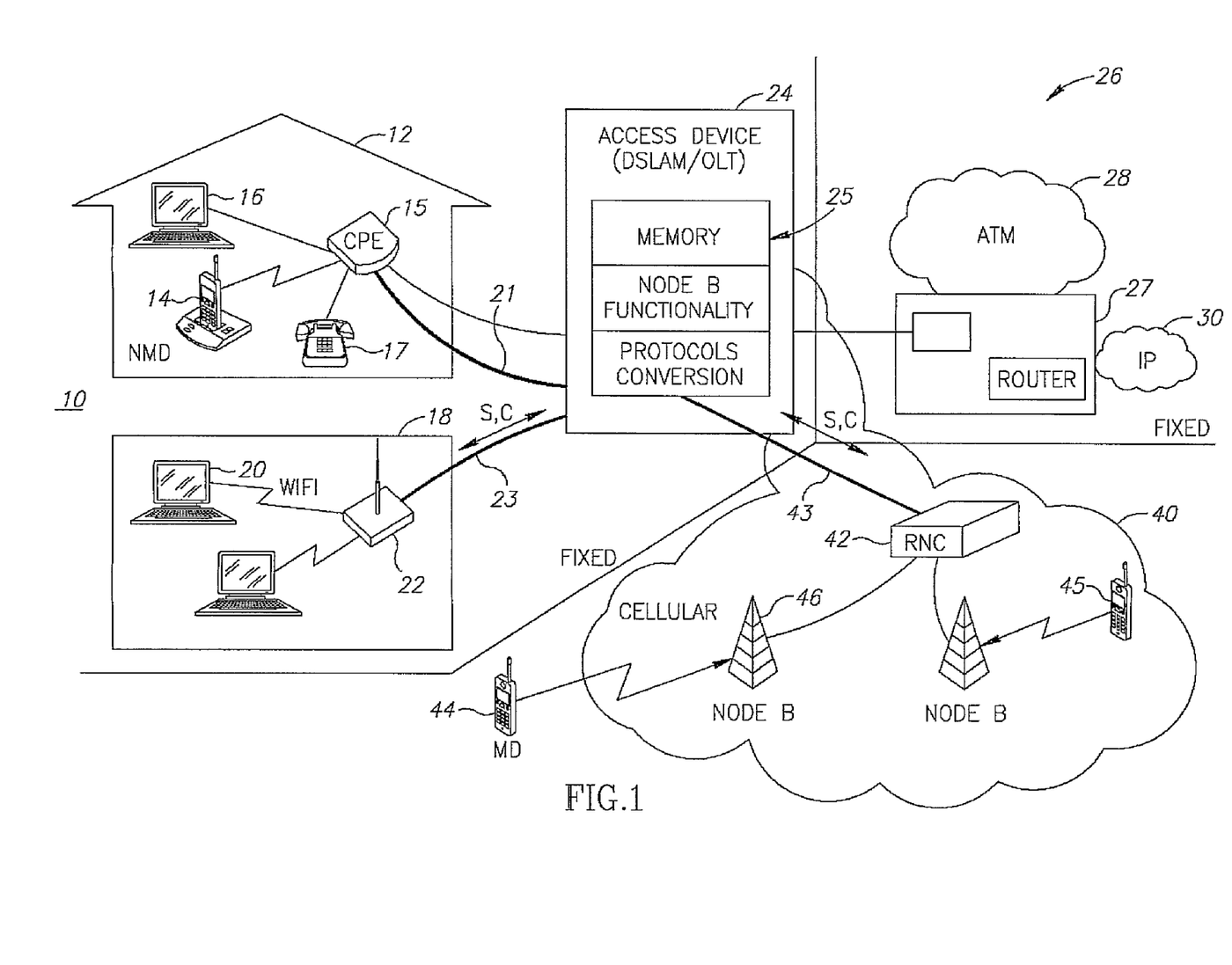
FIG. 1 is a pictorial representation of one particular example of a communications system implementing the proposed technology and comprising an exemplary access device according to the invention.

FIG. 1 illustrates a pictorial diagram of a combined communications networks system. The system comprises a local access network 10 which contains a first private non-mobile network 12 (say, a home network) comprising a cordless phone 14, a computer 16 and a fixed phone 17. Communication sessions to and from the private non-mobile network 12 pass through a CPE (Customer Premises Equipment) 15 located in the house. The access network 10 also includes a second non-mobile home network 18 comprising one or more wireless communication devices, such as a computer 20 communicating via a wireless link to a computerized device 22 serving as a Wireless Fidelity (Wi-Fi) access point of a wireless local loop system. Both the CPE 15 and the access point 22 are connected in a wireline manner (say, via DSL cables/fibers 21 and 23) to a DSLAM 24. However, the access device may comprise OLT or a hybrid apparatus instead of DSLAM. Both the connections 21 and 23 allow bi-directional transmission of signaling and communications sessions between the access networks 12, 18 and the access device 24 (see an arrow marked S,C.) The DSLAM 24 comprises an access device and supports protocols of the non-mobile home networks 12 and 18; being an edge node between different types of networks, it is designed to support at least a protocol of a mobile communications network 40. Moreover, the DSLAM 24, connected by DSL cables to the private networks 12 and 18, is also connected to an RNC (Radio Network Controller) 42 of the mobile network; the DSLAM therefore forms a part of the cellular network 40. FIG. 1 shows that the connection between the DSLAM and the RNC is via a wireline link 43 (DSL lines, fiber, etc). The connection 43 ensures a bi-directional signaling and communications exchange (marked with an arrow marked S,C) between the access device 24 and the RNC 42. RNC is only one example of controlling means in a mobile (cellular) network which could be used to achieve the object of the present invention.

The DSLAM 24 may additionally be connected to other types of networks (say, a fixed network 26 comprising an ATM 28 and IP 30 sub-networks), and constitutes a border node between at least one other pair of the networks associated with it.

According to the invention, the DSLAM 24 (or DSLAM 24 in combination with CPE 15, or Optical Line Termination OLT in combination with ONU/ONT, or the like) are some of possible embodiments of an access device serving an edge node, or an integrating node between a mobile (cellular) network 40 and a non-mobile access network 10. In this drawing, the access device is DSLAM 24, additionally provided with a functional block 25 supporting its novel functions and allowing it to act as a base station of the cellular network 40 in respect of the controller 42. To this end, the block 25 comprises software and/or hardware means that enable the DSLAM to perform functions similar to that of "Node B" of the mobile network: maintaining digital communication with RNC 42, determining proximity of a mobile device 44 (based on signaling with respect to the mobile device, for example received from a non-mobile device 17), and supporting the mobile communication session in its area (for example by rerouting the communication session from the mobile device 44 to a non-mobile device 17 and vice versa). The mobile device 44 may be located quite far from the LAN, but the communication session can be rerouted if an appropriate signaling information is obtained by the access device 24. Such a signaling information can be applied to the access device by the user. It is understood that when rerouting a communication session from one network to another, which operate using different protocols, the access device should be capable of transforming the communication protocols. Therefore, the functional block 25 also comprises the appropriate sub-unit.

This "quasi" Node B functionality of the access device comprises serving at least some pre-determined mobile (cellular) telephone numbers registered in the access device, and may include providing various services characteristic to cellular networks. The access device is also useful in serving such cellular devices/numbers which are registered in its memory as respectively associated with particular non-mobile devices/numbers of the non-mobile network (for example, the numbers belonging to one and the same user). Therefore, the functional block 25 also comprises a memory unit.

In a case of a common receiver serving both as a mobile device and as part of a non-mobile cordless device, the function of identifying and determining proximity of the mobile device can be performed automatically, via the base of the cordless device being in communication with the access device. In other cases, these functions are performed based on the signaling received either at the access device from a non-mobile device (directly), or at a controller—say RNC 42—from the mobile device via its closest base station, whenever the rerouting is requested. Service of the mobile devices is therefore performed by the access device with the aid of the cellular controlling unit interconnected therewith.

The combined network system further comprises, for example, a fixed network 26 with a routing junction 27. The routing junction 27 performs navigation of data incoming the fixed network 26, either to an ATM—based portion 28 of the fixed network 26 (i.e., the network operating in the format of Asynchronous Transfer Mode), or to an IP portion 30 (the network utilizing Internet Protocol), and vice versa. The cellular network 40 (say, using Asynchronous Transfer Mode—ATM format) may be further connected with networks of other types.

However, the communication sessions which are considered in the frame of the present patent application are those established along a communication path via a number of different network sections, but including at least a portion in the cellular network 40, and associated with its mobile device 44 (having the mobile telephone number registered in access device 24 of the non-mobile network 10 with reference to the non-mobile device 17). For example, the communication path is established between a mobile device 45 and the mobile device 44. It should be kept in mind that the number of 44 is "replaced" by a number of non-mobile device 17. When rerouting the session according to the invention, the communication path may selectively comprise a) a mobile network section in the network 40 between a particular mobile device 44 and its closest base station 46 controlled by the RNC 42; b) a non-mobile network section in the access network 10 between the non-mobile device 17 and the access device 24 serving a base station of the controller RNC 42, under control of the same RNC 42.

Thereby, owing to the new functionality of the access device 24, and since RNC 42 is wireline connected and maintains digital communication with the access device 24, the cellular section of the communication path can reversibly be replaced with the fixed section in the access network 10, if so desired.

Figure 2:
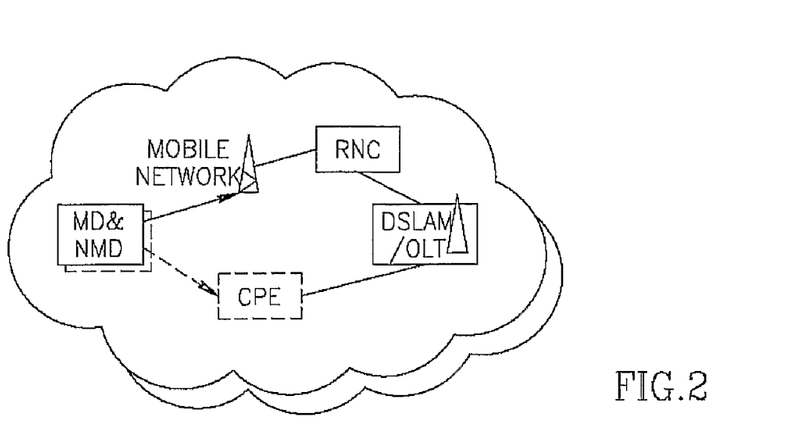
FIGS. 2, 3, 4 illustrate three different scenarios assisting to understand the method according to the invention.

FIG. 2 illustrates a first scenario, with a mobile device with a DECT functionality having a single mobile number. According to definitions used in the present application, it is the case when the mobile device and the non-mobile device is one and the same device having one and the same mobile telephone number.

The illustration shows a mobile network comprising an access device DSLAM/OLT which behaves as a base station of the mobile network (due to that it is provided with a symbolic sign of the base station or node B). Since in this example we do not have non-mobile telephone numbers, the access network is presented only by the access device DSLAM/OLT. The "NMD" portion of the integrated device and its CPR are shown by dotted lines in the mobile network since the access device DSLAM/OLT simulates the access network as part of the mobile network, at least in respect of the mentioned single mobile number of the DECT device.

Scenario 1.

A mobile device is connectable to the DSLAM/OLT (e.g., has also a DECT functionality). It has a single mobile number. The DSLAM/OLT is aware of the mobile number.

When the user starts a mobile session and enters home, the DSLAM/OLT detects its presence and reports to the RNC that it can serve the call and the call reroutes to the DSLAM/OLT When the user starts a session from home, it is a mobile call (because the device has a mobile number). When the user leaves home the DSLAM/OLT reports to the RNC that he cannot serve the call and the call is supported from another node B.

Figure 3:
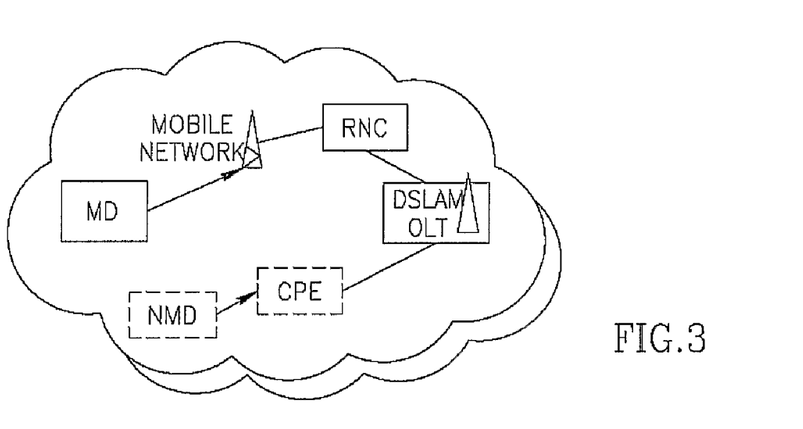

FIG. 3 illustrates a second scenario; a mobile device MD and a non-mobile device NMD having one and the same mobile number act in the scenario. According to our definitions, the devices are separate, but the number is common.

The illustration also shows a mobile network comprising an access device DSLAM/OLT which imitates a base station functionality in the mobile network. Since the non-mobile NMD device has the mobile number and is "seen" from the DSLAM/OLT as a mobile device, both NMD and its customers premises equipment CPE are shown in dotted lines in the mobile network. Also in this example we do not illustrate a non-mobile access network, though it exists; it is presented by the access device DSLAM/OLT.

Scenario 2:

A mobile device and a non-mobile device with the same mobile number. DSLAM/OLT is aware of the mobile number.

When the user starts a session from the mobile device and enters home he can pick up the non-mobile device and press a button or insert a code. The DSLAM/OLT detects this event and reports to the RNC that it can serve the call and the call reroutes to the DSLAM/OLT When the user starts a session from the non-mobile device, it is a mobile call (because the device has a mobile number). When the user leaves home he should press a button or insert a code in the mobile device. The RNC will determine that the call should be rerouted to the node B (other than the DSLAM/OLT) that serves the mobile device.

Probably it is impossible to start a new call from the mobile device while there is an active call from the non-mobile device or vice versa.

Figure 4:
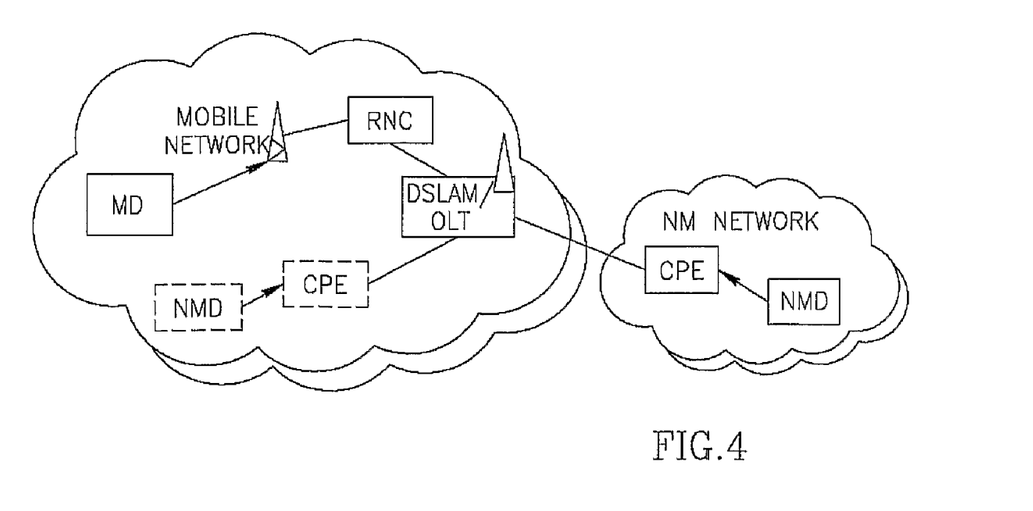

FIG. 4 illustrates yet another scenario where the mobile device MD and the non-mobile device NMD are separate and the telephone numbers are respectively different. These two telephone numbers are registered in association with one another in the access device DSLAM/OLT. FIG. 4 illustrates a mobile network with an appended portion of a non-mobile network (NM network) comprising the NMD and its CPE shown in solid lines; however, both the non-mobile NMD device and its CPE are also shown in the cellular network in dotted lines, since the access device DSLAM/OLT performs functions of node B, and the non-mobile device NMD having its non-mobile number consequently imitates the mobile device MD having its mobile number.

Scenario 3:

A mobile device and a non-mobile device are separate devices. The mobile device has a mobile number, and the non-mobile device has a non-mobile number.

The DSLAM/OLT should be aware of both numbers.

When the user starts a session from the mobile device and enters the home, he can pick up the non-mobile device and press a button or insert a code. The DSLAM/OLT detects this event and reports to the RNC that it can serve the mobile call (associated with the programmed mobile number) and the call is rerouted to the DSLAM/OLT.

When the user starts a session from the non-mobile device, he/she has two choices:

1. By default, the call will be non-mobile and there will be no way to reroute it to a mobile device (out of the scope of the invention; remember that the present invention considers only mobile communications sessions). The case is illustrated by the solid CPE and NMD in the NM network which may be connected, via the DSLAM/OLT, to another, non-mobile network (not shown, can be like 26 in FIG. 1).

2. If the user wishes to perform a mobile call (insert a code or push a button), then the call starts as a mobile call and must pass via the Mobile Network. When the user leaves the home he/she should press a button or insert a code in the mobile device. The RNC will determine that the call should be rerouted to a regular node B that serves the mobile device.

The default should preferably be that all outgoing calls are mobile and a special code would make the outgoing call non-mobile. Of course, the alternative default option can be used.

It should be appreciated that other embodiments of the device and of the system as well as other versions of the method can be proposed, which are to be considered part of the invention if not departing from the claims that follow.

The invention claimed is:

1. A method of supporting an incoming/outgoing mobile communication session in a combined communications network comprising a mobile network and a non- mobile access network; in said mobile network, said mobile communication session is associated with a mobile number, the method comprises:

providing, at an access node between the non-mobile access network and the mobile network, an access device comprising, a Digital Service Line Access Multiplexer (DSLAM) or an Optical Line Termination (OLT), the access device-being in communication with a plurality of non-mobile devices in the non-mobile access network;

establishing direct connection and direct signaling and communications exchange between the access device and a controller of the mobile network and providing the access device with a capability to perform functions of a base station with respect to at least one said mobile number of said mobile network, so that the access device is recognized by the controller of the mobile network as a base station;

by assignment in the access device, associating said mobile number with a non-mobile device of said non-mobile network, wherein said non-mobile device being either a DECT-like device, or a fixed device, so that the access device becomes operative to represent said non-mobile device of said plurality of non-mobile devices as having said mobile number;

routing said mobile communication session, by said controller of the mobile network, via said access device as via the base station;

selectively conducting said mobile communication session either through a mobile device associated with said mobile number in the mobile network, or through the non-mobile device associated with said mobile number in the non-mobile network.

2. The method according to claim 1, further comprising setting defaults at said access device, for routing of communication sessions.

3. The method according to claim 1, further comprising providing the controller of the mobile network with a capability of giving preference to said access device for routing there-through the mobile communication session to said non-mobile device.

4. The method according to claim 1, comprising storing the mobile number in the access device with indicating association of said mobile number with the non-mobile device of said non-mobile network.

5. The method according to claim 1, wherein said mobile telephone number is a single number to both said mobile device and said non-mobile device.

6. The method according to claim 1, wherein the mobile device has the mobile number and the non-mobile device has a non-mobile number assigned in the access device, wherein said access device associates the mobile number and the non-mobile number with one another.

7. The method according to claim 1, comprising a step of transferring said communication session in progress from the non-mobile device to the mobile device, and vice versa.

8. A method of supporting a mobile communication session in a combined network comprising a mobile network, a non-mobile access network and an access device placed there-between and comprising a Digital Service Line Access Multiplexer (DSLAM) or an Optical Line Termination (OLT), wherein the access device performing direct signaling and communications exchange with a controller of the mobile network and performing functions of a base station of the mobile network, the method comprising routing said mobile communication session via the access device as via the base station, selectively conducting said mobile communication session either through a mobile device of the mobile network, or through a non-mobile device of the non-mobile network, with a possibility of re-routing, during said mobile communication session, from the mobile device to the non-mobile device or vice versa, wherein said mobile device and said non-mobile device are two separate devices.

9. The method according to claim 8, wherein the step of rerouting is preceded by obtaining a suggestion to reroute the communication session.

10. A method of supporting a mobile communication session in a combined communications network comprising a mobile network, a non-mobile access network, and an access device placed there-between and comprising a Digital Service Line Access Multiplexer (DSLAM) or an Optical Line Termination (OLT), the method comprises:

providing the access device with a capability to perform functions of a base station with respect to at least some mobile numbers of said mobile network, providing the access device with a capability to represent at least some non-mobile devices of the non-mobile network as respectively having said at least some mobile numbers, establishing direct signaling and communications exchange between the access device and a controller of the mobile network, routing said mobile communications session via the access device as via the base station, wherein said session is associated with one of said at least some mobile numbers;

selectively conducting said mobile communications session either through a mobile device associated with said one mobile number in the mobile network, or through a non-mobile device of the non-mobile access network, being represented by the access device as having said one mobile number.

11. The method according to claim 9, wherein the suggestion of rerouting is applied from the mobile device or the non-mobile device presently not engaged with the communication session.

12. The method according to claim 9, wherein the step of obtaining the suggestion of rerouting is performed non-automatically and initiated by a user from the mobile device or the non-mobile device.

13. The method according to claim 8, wherein the step of rerouting is preceded by determining proximity of the mobile device to the non-mobile device.

14. An access device for serving a non-mobile access network comprising DECT- and/or fixed non-mobile devices, wherein said non-mobile network being part of a combined communications network also comprising a mobile network, wherein the access device comprising a Digital Service Line Access Multiplexer (DSLAM) or an Optical Line Termination (OLT) adapted to maintain direct signaling and communications exchange with a controller of the mobile network;

the access device being adapted to communicate with a plurality of the non-mobile devices of the non-mobile network and with said controller of said mobile network, and to represent a non-mobile device of said plurality of non-mobile devices as having a mobile number of the mobile network;

the access device being recognizable by the controller of the mobile network as another base station of the mobile network and is capable of performing, at least partially, functions of a base station of the mobile network for at least said mobile number of said mobile network by allowing routing, via said access device, of a mobile communication session associated in said mobile network with said mobile number;

and by selectively conducting said mobile communication session either through a mobile device associated with said mobile number, or through the non-mobile device of the non-mobile network, presented by the access device as having said mobile number.

15. The access device according to claim 14, wherein the mobile number belonging to said mobile network is stored in said access device as a number that is associated with a non-mobile device connected to said non-mobile network, and wherein said non-mobile device is also associated with a non-mobile number.

16. The access device according to claim 15, allowing said mobile communication session, being initially conducted through either said non-mobile device or a mobile device associated with said mobile number, to be continued by using the other of said mobile device or said non-mobile device, according to selection of a user.

17. The access device according to claim 14, being connectable with said non-mobile access network and with the controller of said mobile network to enable digital communication, being capable of converting communication protocols from at least one protocol used in said mobile network to at least one protocol used in said non-mobile network, and vice versa, being provided with a functional unit performing functions similar to that of a base station of said mobile network, including:

enabling storing at the access device at least one said mobile number assigned to a mobile device, in association with at least one said non-mobile device, monitoring and processing signaling sessions and communications sessions associated with said mobile telephone number.

18. The access device according to claim 14, capable of indirectly determining proximity, to said non-mobile device, of a mobile device associated with said mobile telephone number in the mobile network.

19. A system operative to support a communication session in a combined communications network, the system comprising at least one access device according to claim 14, at least one non-mobile network connected to said access device and comprising at least one non-mobile device, and at least one mobile communications network associated with at least one mobile device and having a controller of the mobile network directly connected to said access device and operative to establish digital communication with said access device.

20. The access device according to claim 14, allowing said mobile communication session to be conducted via either said non-mobile device or a mobile device associated with said mobile number, according to selection of a user.

21. An access device of a non-mobile access network for serving in a combined communication network comprising the non-mobile access network and a mobile network, the access device:

comprising a DSLAM or an OLT adapted to maintain direct signaling and communications exchange with a controller of the mobile network;

being capable of performing, at least partially, functions of a base station of the mobile network;

being recognizable by said controller as a base station of the mobile network;

being adapted to routing there-through a mobile communication session and to selectively conducting said mobile communication session either through a mobile device of the mobile network, or through a non-mobile device of the non- mobile network.

22. The access device according to claim 21, being adapted to:

perform functions of a base station with respect to at least some mobile numbers of said mobile network, represent at least some non-mobile devices of the non-mobile network as respectively having said at least some mobile numbers, and selectively conduct said mobile communications session associated with one of said at least some mobile numbers either through the mobile device associated with said one mobile number in the mobile network, or through the non-mobile device of the non-mobile access network, being represented by the access device as having said one mobile number.

* * * * *